United States Patent [19]

Dow et al.

[11] 4,232,058
[45] Nov. 4, 1980

[54] METHOD OF COATING A LAMP WITH A U.V. CURABLE RESIN WITH FIBERS THEREIN

[75] Inventors: Judith A. Dow, Boston; Timothy Fohl, Carlisle, both of Mass.

[73] Assignee: GTE Products Corporation, Stamford, Conn.

[21] Appl. No.: 950,961

[22] Filed: Oct. 13, 1978

Related U.S. Application Data

[62] Division of Ser. No. 699,139, Jun. 23, 1976.

[51] Int. Cl.³ .................. B05D 1/18; B05D 3/06; F21K 5/02
[52] U.S. Cl. .................. 427/54.1; 156/172; 427/106; 427/206; 427/443.2; 431/360
[58] Field of Search .................. 156/172, 272; 220/2.1 R, 2.1 A; 215/DIG. 6, 12 R; 431/360, 364; 428/35, 36; 427/105, 106, 54, 195, 71, 206, 108, 430 B

[56] References Cited

U.S. PATENT DOCUMENTS

| | | | |
|---|---|---|---|
| 2,395,267 | 2/1946 | Gilbert | 215/12 R |
| 3,057,505 | 10/1962 | Chapman et al. | 220/2.1 A |
| 3,223,273 | 12/1965 | Thorington | 220/2.1 R |
| 3,992,276 | 11/1976 | Powanda et al. | 427/54 |
| 4,008,341 | 2/1977 | Kehr | 427/54 |
| 4,012,553 | 3/1977 | Clements | 427/54 |
| 4,076,489 | 2/1978 | Schroeter et al. | 431/360 |
| 4,107,356 | 8/1978 | Ukihashi et al. | 427/195 |

Primary Examiner—Michael W. Ball
Attorney, Agent, or Firm—Edward J. Coleman

[57] ABSTRACT

A photoflash lamp having a glass envelope with a clear protective exterior coating comprising a photopolymer reinforced with glass fibers. In applying the coating, a long strand of glass fibers is wrapped about the lamp envelope, which is then dipped in a liquid photopolymer, or short lengths of glass fiber are dispersed throughout the liquid photopolymer, either by premixing or application after dipping. The wet-coated lamp is then cure-hardened by a short period of irradiation with a source of ultraviolet light.

4 Claims, 2 Drawing Figures

METHOD OF COATING A LAMP WITH A U.V. CURABLE RESIN WITH FIBERS THEREIN

This is a division, of application Ser. No. 699,139 filed June 23, 1976.

BACKGROUND OF THE INVENTION

This invention relates to lamps with a protective envelope coating and, more particularly, to a protective coating for flashlamps and a method for applying such a coating.

A typical photoflash lamp comprises an hermetically sealed glass envelope, a quantity of combustible material located in the envelope, such as shredded zirconium or hafnium foil, and a combustion supporting gas, such as oxygen, at a pressure well above one atmosphere. The lamp also includes an electrically or percussively activated primer for igniting the combustible to flash the lamp. During lamp flashing, the glass envelope is subject to severe thermal shock due to hot globules of metal oxide impinging on the walls of the lamp. As a result, cracks and crazes occur in the glass and, at higher internal pressures, containment becomes impossible. In order to reinforce the glass envelope and improve its containment capability, it has been common practice to apply a protective lacquer coating on the lamp envelope by means of a dip process. To build up the desired coating thickness, the glass envelope is generally dipped a number of times into a lacquer solution containing a solvent and a selected resin, typically cellulose acetate. After each dip, the lamp is dried to evaporate the solvent and leave the desired coating of cellulose acetate, or whatever other plastic resin is employed.

In the continuing effort to improve light output, higher performance flashlamps have been developed which contain higher combustible fill weights per unit of internal envelope volume, along with higher fill gas pressure. In addition, the combustible material may be one of the hotter burning types, such as hafnium. Such lamps, upon flashing, appear to subject the glass envelopes to more intense thermal shock effects, and thus require stronger containment vessels. One approach to this problem has been to employ a hard glass envelope, such as the borosilicate glass envelope described in U.S. Pat. No. 3,506,385, along with a protective dip coating. Although providing some degree of improvement in the containment capability of lamp envelopes, the use of dip coatings and hard glass present significant disadvantages in the areas of manufacturing cost and safety. More specifically, the hard glass incurs considerable added expense over the more commonly used soft glass due to both increased material cost and the need for special lead-in wires to provide sealing compatibility with the hard glass envelope. In addition, even though more resistant to thermal shock, hard glass envelopes can also exhibit cracks and crazes upon lamp flashing, and, thus, do not obviate the need for a protective coating.

In the typical solvent dipping process for applying protective coatings, a large number of flashlamps are loaded on a rack and then successively dipped in a solvent solution and oven dried three or four times to build up the desired coating thickness. Such a process is time consuming, uses a relatively large area of production floor space, and involves considerable hand labor, all of which add significantly to manufacturing cost. Further, as the lacquer solution includes a highly flammable solvent, such as acetone, an inadvertant flashing of one of the lamps in either the dip bath or drying oven can ignite the solvent fumes. To substantially reduce or eliminate this hazard, costly automatic extinguishing equipment must be employed. In the event of a solvent ignition, the resulting downtime and consumption of fire extinguishing chemical also adds to the manufacturing cost.

Another approach to providing a more economical and improved containing vessel is described in U.S. Pat. No. 3,893,797, wherein a thermoplastic coating, such as polycarbonate, is vacuum formed onto the exterior surface of the glass envelope. The method of applying the coating comprises: placing the glass envelope within a preformed sleeve of the thermoplastic material; drawing a vacuum in the space between the thermoplastic sleeve and the glass envelope; and, simultaneously heating the assembly incrementally along its length, whereby the temperature and vacuum cause the thermoplastic to be incrementally formed onto the glass envelope with the interface substantially free of voids, inclusions and the like. This method provides an optically clear protective coating by means of a significantly faster, safer and more economical manufacturing process, which may be easily integrated on automated production machinery.

Yet another approach to protective coatings for lamps is disclosed in U.S. Pat. No 3,233,273, wherein the exterior surface of the glass envelope of an incandescent lamp is coated with an adhesive resin, such as a phenyl or methyl polysiloxane, and then wrapped with a layer of fiber glass yarn having an index of refraction about the same as that of the resin. Prior to wrapping, the yarn is treated with a wetting agent in solvent solution form. Upon completing the dipping and wrapping processes, the covered lamp is placed in a baking oven to cure the resin. The lamp may then be redipped in resin and again cured. Although, providing a relatively strong lamp coating, it will be noted that the above described yarn-warp approach is characterized by many of the same manufacturing disadvantages of the aforementioned solvent dipping process.

SUMMARY OF THE INVENTION

In view of the foregoing, it is an object of the invention to provide an improved lamp coating and an improved method of applying the coating.

A principle object of the invention is to provide a photoflash lamp having a stronger envelope structure for providing improved containment during flashing.

Another object of the invention is to economically provide an improved containment vessel for a flashlamp.

A further object of the invention is to provide an improved method for applying a protective coating on the glass envelope of a photoflash lamp.

These and other objects, advantages and features are attained, in accordance with the invention, by providing on the exterior surface of a lamp envelope a coating comprising a photopolymer in combination with reinforcing fibers. Preferably the fibers are glass, and the photopolymer and fibers have about the same index of refraction. The reinforcing glass fibers may be in the form of a long strand wrapped about the envelope, with the photopolymer covering the fiber wrapping, or the fibers may comprise short lengths dispersed throughout the photopolymer coating.

One embodiment of the improved method comprises: dipping a long strand of fibers into a liquid photopolymer to wet the strand, wrapping the wet strand about the lamp envelope, dipping the fiber-wrapped envelope into the liquid photopolymer, and then cure hardening the photopolymer coating by irradiating the lamp envelope with a source of ultraviolet light for a period of between about 0.1 second and 10 seconds. According to another embodiment in lieu of wrapping, reinforcement is provided by mixing short lengths of fiber into the liquid photopolymer before dip-coating the lamp. According to yet another embodiment, the lamp envelope is initially dipped into the liquid photopolymer, then the short fiber lengths are applied to the wet coating.

When employed on photoflash lamps, this fiber reinforced coating exhibits a superior containment capability along with excellent photometric characteristics. The method of applying the coating provides several advantages to the lamp manufacturing process. The process is solvent-free, requires a minimum of floor space, and can be readily adapted to automated lamp production apparatus. Of particular importance, cure time is reduced to a matter of seconds or even tenths of a second, with UV lamps replacing large drying ovens to provide significant space and energy savings. A hard cure is effected immediately, without the need for warehousing to assure a complete cure.

BRIEF DESCRIPTION OF THE DRAWINGS

This invention will be more fully described hereinafter in conjunction with the accompanying drawings, in which.

DESCRIPTION OF PREFERRED EMBODIMENTS

Figure 1:
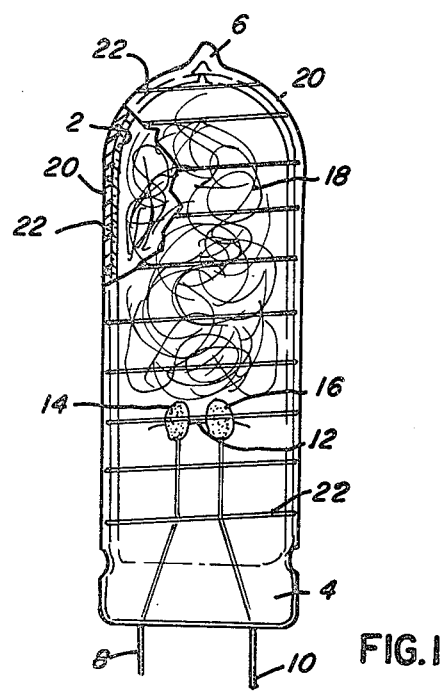
FIG. 1 is an elevational view, partly in section, of an electrically ignitable photoflash lamp having one embodiment of a fiber-reinforced, protective coating in accordance with the invention, a strand of the fiber being wrapped about the lamp envelope.

The teachings of the present invention are applicable to a wide variety of lamps of different sizes and shapes; however, the invention is particularly advantageous as applied to photoflash lamps having tubular shaped envelopes with a volume of less than one cubic centimeter. This advantage rests in the significantly superior containment capability exhibited by small photoflash lamps coated in accordance with the invention. For puposes of example, the invention will be described as applied to the electrically ignitable, filament-type photoflash lamps illustrated in the drawings; however it will be understood that the same principles are applicable to high voltage or percussively ignited flashlamps.

Referring to FIG. 1, one embodiment of the coated lamp is illustrated comprising an hermetically sealed lamp envelope 2 of glass tubing having a press 4 defining one end thereof and an exhaust tip 6 defining the other end thereof. Supported by the press 4 is an ignition means comprising a pair of lead-in wires 8 and 10 extending through and sealed into the press. A filament 12 spans the inner ends of the lead-in wires, and beads of primer 14 and 16 are located on the inner ends of the lead-in wires 8 and 10, respectively, at their junction with the filament. Typically, the lamp envelope 2 has an internal diameter of less than one-half inch, and an internal volume of less than one cubic centimeter. A combustion supporting gas, such as oxygen, and a filamentary combustible material 18, such as shredded zirconium or hafnium foil, is disposed within the lamp envelope. Typically, the combustion supporting gas fill is at a pressure exceeding one atmosphere, with the more recent subminiature lamp types having oxygen fill pressures of up to several atmospheres. As will be described in more detail hereinafter, the exterior surface of the glass envelope 2 is covered with a protective coating comprising a photopolymer 20 reinforced with a long strand of fibers 22 wrapped about the lamp envelope.

A percussive type photoflash lamp is described in several prior patents of the present assignee; for example U.S. Pat. No. 3,674,411. As described therein, the percussive lamp also includes a sealed glass envelope containing a filamentary combustible material and a combustion-supporting gas; however, the ignition means comprises a metal primer tube sealed in and depending from one end of the glass envelope and containing a coaxially disposed wire anvil partially coated with a charge of fulminating material.

A high voltage type photoflash lamp is described in a number of patent applications of the present assignee; for example, Ser. No. 673,569, filed Apr. 5, 1976, now U.S. Pat. No. 4,059,388. As described therein, the lamp includes a sealed glass envelope containing a filamentary combustible material and a combustion-supporting gas; however, the ignition means comprise a mass of primer material bridging a pair of lead-in wires, one of which is enclosed in an insulating sleeve.

Although somewhat different in structure and operation, the filament, high-voltage, and percussive lamps are similar in that in each the ignition means is attached to one end of the lamp envelope and disposed in operative relationship with respect to the filamentary combustible material. More specifically, the igniter filament 12 of the flashlamp of FIG. 1 is incandesced electrically by current passing through the metal filament support leads 8 and 10, whereupon the incandesced filament ignites the beads of primer 14 and 16 which in turn ignite the combustible 18 disposed within the lamp envelope to provide the actinic light output. Operation of the percussive-type lamp is initiated by an impact onto the primer tube to cause deflagration of the fulminting material up through the tube to ignite the combustible disposed within the lamp envelope. Operation of the high-voltage type lamp is initiated when a high voltage pulse from, e.g., a piezoelectric crystal, is applied across the two lead-in wires; electrical breakdown of the primer causes its deflagration which, in turn, ignites the shredded metallic combustible.

In accordance with the present invention, we have discovered a solventless, rapid method for providing an optically clear protective coating on the exterior surface of the glass envelope which results in a superior containment vessel. The method provides a significantly faster, safer and more economical manufacturing process, and it may easily be integrated into automated production machinery. The resulting coating provides a combined envelope structure which is more resistant to both mechanical and thermal shock. As a result, this coating reduces the cost of materials by permitting the use of soft glass to meet higher containment requirements.

The coating comprises a fiber reinforced plastic. The fibers may be plastic, but glass is preferred. In order to provide the desired optical clarity, it is also preferred that the index of refraction of the plastic material be approximately the same as that of the reinforcing glass fibers. Of course, fiber glass reinforced plastic resins have been disclosed in the prior art, for example, see U.S. Pat. Nos. 2,850,421; 2,963,612; 3,127,295; 3,146,499; and the previously referenced 3,223,273. These prior art reinforced resins, however, required a relatively long curing period, as convection oven heating or open air drying was typically employed. This in turn led to problems of the fiber glass fuzzing out from the resin coating during the relatively long time to hardening. To counteract this effect and attempt to provide a smoother coating surface, prior art processes employed rollers to flatten the fibers and then application of a second covering coat of the resin, requiring an additional long period of curing.

In accordance with the present invention, the aforementioned problems encountered in prior art fiber reinforced plastics is overcome by using a photopolymer, denoted as 20 in FIG. 1, as the primary coating material with which the reinforcing glass fibers are combined. The term "photopolymer" is understood to mean a radiation curable polymer. Rapid curing of such a polymer results from any stimulus that generates free radicals. For example, free radical initiation can be effectively provided by a source of ultraviolet (UV) light or electron beams.

Ultraviolet light in the 185 to 400 nanometer wavelength range is required for UV cures, with peak sensitivity at about 365 nanometers. UV light from commerical mercury vapor, mercury-metal halide, or pulsed xenon lamps is effective in the required wavelength range.

Curing time with UV light ranges from fractions of a second to minutes depending on film thickness, polymer structure, UV light intensity, and initiator type concentration. In the present application of coating photoflash lamp envelopes in thicknesses of from 5 to 40 mils, curing time can range between 0.1 second to 10 seconds. Curing can be effected in air, under vacuum, or in an inert gas atmosphere.

In view of this very rapid curing time, the photopolymer coating hardens before the glass fibers can spring out from the briefly viscous medium on the curved lamp surface. Hence, surface fuzziness is minimized or eliminated, and a clear, relatively smooth-surface envelope is provided.

The photopolymer may basically comprise a polyester, acrylic, polyurethane or any of a number of general groups. To render the material UV curable, however, one must use a photosensitizer or photoinitiator (such as a benzoin ether which will directly or indirectly give free radicals when exposed to UV radiation, even at room temperature.

Examples of fast curing photopolymers include polyfunctional monomers, such as ethylene glycol diacrylate, trimethylol propane triacrylate, and pentaerythritol tetraacrylate. A specific photopolymer, we have found to be particularly useful in coating photoflash lamps, and providing the deisred index of refraction match with the Corning type E glass typically employed in the reinforcing fibers, is RCC Blend 15 of W. R. Grace & Co., Columbia, Md., which is a thiolene based material.

With regard to the reinforcing material, generally glass fibers are commerically available either as chopped strands or milled strands. In the manufacture of such fibers, molten glass is passed through a sieve-like structure to produce a multitude of molten glass streams. These streams are attenuated into very fine fibers either by high velocity jets of air and steam or by mechanical drawing. The fibers are then generally sprayed with a sizing material for the purpose of lubricating the fibers and bonding them when they are brought together to form glass strands, sometimes known as "roving". Since the usual sizing material is a lubricant, it can inhibit the necessary adhesion between the glass fibers and the photopolymer; therefore, the glass strands can be heat treated to remove the sizing material after the manufacture of the glass strand.

The glass strand generally consists of many individual fibers which are bound together, during manufacture, by the above-mentioned sizing material. Individual fiber diameters generally are between 0.2 and 0.7 mils while strand diameters can vary from about 1 to 20 mils and can consist of a very few fibers to about 100 or more.

In FIG. 1, the composite coating comprises a long strand 22 of the glass fibers wrapped about the envelope 22 to cover a substantial portion thereof, with the photopolymer 20 covering the fiber wrapping. The drawing shows the wrapping 22 for purposes of illustration; however, if the indices of refraction of the photopolymer and glass fibers are matching, the strand 22 would actually be invisible and the coating would appear optically clear.

A preferred method of applying the coating of FIG. 1 comprises: first dipping a long strand 22 of fiber glass into a liquid photopolymer to wet the strand; then, wrapping the wetted strand of fibers about the envelope 2; thereafter, dipping the fiber-wrapped envelope into the liquid photopolymer; and then irradiating the coated envelope with a source of ultraviolet light for a period between 0.1 second and 10 seconds so as to cure-harden the photopolymer 20 coated on the lamp envelope.

In a specific example of coating a flashlamp of the type used in flashcubes or flash bars, a twelve inch strand 22 of fiber glass was used to provide about twenty wraps about the lamp envelope. The aforementioned Grace & Co., RCC Blend 15 photopolymer was used. The wrapped lamp was dipped into a vat of the photopolymer at 60° C. and then cured for 5-10 seconds with a quartz jacketed 400 watt mercury lamp. To provide a thicker coating, the lamp was then redipped into the photopolymer at room temperature (about 25° C.) and again UV cured for 5-10 seconds. The average coating thickness was about 14 mils, with about 0.25 grams of photopolymer material on each lamp.

Figure 2:
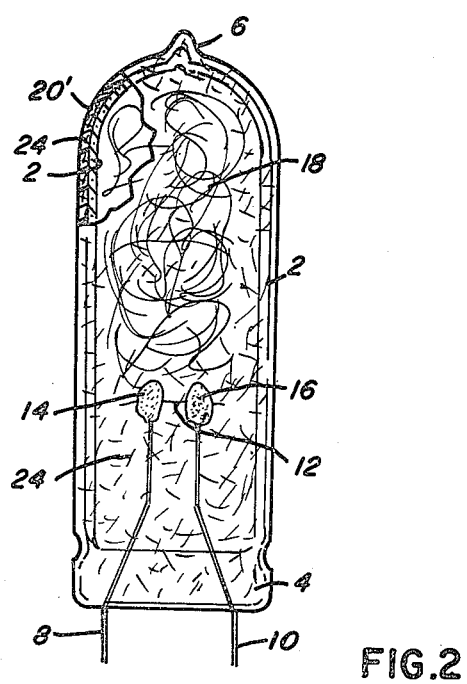
FIG. 2 is an elevational view, partly in section, of an electrically ignitable photoflash lamp having another embodiment of a fiber-reinforced protective coating in accordance with the invention, short lengths of fiber being dispersed throughout the coating.

FIG. 2 shows the same basic lamp as FIG. 1, with the same numerals being used to identify like elements, but the fiber reinforced coating comprises a photopolymer 20' with short lengths of the glass fibers 24 dispersed throughout.

The photopolymer can be the same as that discussed above. If the indices of refraction are matched, the short fibers will actually be invisible in the coating.

To provide the short fibers, continuous lengths of fiber glass strand can be chopped to specific desired lengths, or individual lengths of monofilament fiber can be used. For the purpose of this invention, we have found that the strand or fiber length generally should not exceed the length of the maximum dimension of the envelope. Strand lengths of greater length do not usually produce a coating of adequate smoothness, that is, a coating in which fiber ends do not protrude excessively beyond the outer surface of the resin. We prefer fiber lengths between about the length of the maximum envelope dimension and 1/16 inch.

Because of the coarseness and stiffness of the chopped strands which makes it difficult to apply them to the curved surface of a lamp envelope and maintain intimate contact thereto, we prefer to use chopped strands which have been milled. The milling process softens the strand and renders it more pliable, thereby permitting such strands to be more easily contoured to the curved lamp envelope.

One method of applying the coating of FIG. 2 comprises: mixing short lengths of fiber 24 into a liquid photopolymer; dipping the envelope into the mixture of fibers and photopolymer; and irradiating the coated envelope with a source of UV light, as described with respect to the lamp of FIG. 1, to cure-harden the fiber-reinforced photopolymer 20′ coated on the lamp. The rapid photo-curing leaves a relatively smooth coating surface with little or no protruding fibers. The viscosity of the mixture of liquid photopolymer and fibers can be adjusted to allow one dip to achieve a desired coating thickness. In addition, redipping, as described for the lamp of FIG. 1, may be employed to achieve coating thicknesses up to 20 mils.

According to yet another method, the coating of FIG. 2 may be applied by first dipping the envelope 2 into a liquid photopolymer, then applying short lengths of fiber 24, such as by spraying or flocking, onto the wet (tacky) photopolymer coating 20′ on the envelope. The coating is then UV cured as previously described, with redipping employed if desired.

Upon applying the fiber reinforced coating, as described for FIG. 1., on test photoflash lamps of the type described in U.S. Pat. No. 3,955,912, containment was achieved on 100% of the lamps. The test lamps contained oxygen at a pressure of 1600 cm. Hg. and a quantity of paper.

Photometric testing of conventional flashcube type lamps coated as shown in FIG. 1 exhibited efficient light transmission with the output in lumen seconds falling within the required ranges. As a minimum, the coating material of fiber reinforced photopolymer should have a spectral transmittance of at least about 75% of the visible light emitted from the lamp in the wavelength range above about 560 nanometers for coating thickness up to one millimeter. The above tested lamps obviously exceeded this minimum requirement.

Although the invention has been described with respect to a specific embodiment, it will be appreciated that modifications and changes may be made by those skilled in the art without departing from the true spirit and scope of the invention.

What we claim is:

1. A method of applying a protective light-transmitting coating on the exterior surface of a lamp envelope, said method comprising:

mixing lengths of fiber into a liquid photopolymer, said lengths of fiber being between about the length of the maximum dimension of said envelope and 1/16 inch, dipping said envelope into the mixture of fibers and liquid photopolymer, and irradiating the coated envelope with a source of ultraviolet light for a period of between about 0.1 second and 10 seconds so as to cure-harden the fiber-reinforced photopolymer coated on said lamp, whereby a smooth coating surface is provided with minimized protrusion of fibers.

2. The method of claim 1 wherein said envelope is glass and said fibers are glass.

3. A method of applying a protective light-transmitting coating on the exterior surface of a lamp envelope, said method comprising:

dipping said envelope into a liquid photopolymer, applying lengths of fiber onto the wet photopolymer coating on said envelope, said lengths of fiber being between about the length of the maximum dimension of said envelope and 1/16 inch and, irradiating the coated envelope with a source of ultraviolet light for a period of between about 0.1 second and 10 seconds so as to cure-harden the fiber-reinforced photopolymer coated on said lamp, whereby a smooth coating surface is provided with minimized protrusion of fibers.

4. The method of claim 3 wherein said envelope is glass and said fibers are glass.

* * * * *